(12) United States Patent
Grubb et al.

(10) Patent No.: US 6,839,522 B2
(45) Date of Patent: *Jan. 4, 2005

(54) OPTICAL SIGNAL VARYING DEVICES, SYSTEMS AND METHODS

(75) Inventors: Stephen G. Grubb, Columbia, MD (US); Raymond Zanoni, Clarksville, MD (US); Thomas D. Stephens, Columbia, MD (US)

(73) Assignee: Corvis Corporation, Columbia, MD (US)

( * ) Notice: Subject to any disclaimer, the term of this patent is extended or adjusted under 35 U.S.C. 154(b) by 669 days.

This patent is subject to a terminal disclaimer.

(21) Appl. No.: 09/817,478

(22) Filed: Mar. 26, 2001

(65) Prior Publication Data

US 2002/0105703 A1 Aug. 8, 2002

Related U.S. Application Data

(60) Continuation-in-part of application No. 09/119,561, filed on Jul. 21, 1998, now Pat. No. 6,236,487, and a continuation-in-part of application No. 09/544,487, filed on Apr. 7, 2000, now Pat. No. 6,282,002, which is a division of application No. 09/119,556, filed on Jul. 21, 1998, now Pat. No. 6,115,174.

(51) Int. Cl.[7] .......................... H04J 14/02; H04B 10/00; H04B 10/02
(52) U.S. Cl. ........................... 398/158; 398/92; 398/177
(58) Field of Search .......................... 398/92, 141, 158, 398/177, 195; 359/341.1, 341.3, 337, 334, 341.42, 337.11, 337.13, 341.41

(56) References Cited

U.S. PATENT DOCUMENTS

| | | |
|---|---|---|
| 4,315,666 A | 2/1982 | Hicks, Jr. |
| 4,342,499 A | 8/1982 | Hicks, Jr. |
| 4,401,364 A | 8/1983 | Mochizuki |
| 4,616,898 A | 10/1986 | Hicks, Jr. |
| 4,699,452 A | 10/1987 | Mollenauer et al. |
| 4,728,170 A | 3/1988 | Robertson |
| 4,881,790 A | 11/1989 | Mollenauer |
| 5,039,199 A | 8/1991 | Mollenauer et al. |
| 5,050,949 A | 9/1991 | DiGiovanni |
| 5,083,874 A | 1/1992 | Aida et al. |
| 5,095,519 A | 3/1992 | Dorsey |
| 5,191,586 A | 3/1993 | Huber |
| 5,191,628 A | 3/1993 | Byron |
| 5,228,105 A | 7/1993 | Glista |
| 5,283,686 A | 2/1994 | Huber |
| 5,406,411 A | 4/1995 | Button et al. |
| 5,500,756 A | 3/1996 | Tsushima et al. |
| 5,500,764 A | 3/1996 | Armitage et al. ........... 359/341 |

(List continued on next page.)

FOREIGN PATENT DOCUMENTS

| | | |
|---|---|---|
| EP | 0 734 105 A2 | 9/1996 |
| EP | 0853396 A2 | 7/1998 |
| JP | 07202306 A | 8/1995 |
| WO | WO 98/42088 | 9/1998 |

OTHER PUBLICATIONS

Park, S.Y., et al., Feasibility Demonstration of 10 Gbit/s Channel WDM Network Using Dynamic Gain–Controlled EDFAs, Electronics Letters, Mar. 5th, 1998, vol. 34, No. 5., Online No. 19980346.

(List continued on next page.)

*Primary Examiner*—M. R. Sedighian
*Assistant Examiner*—Dalzid Singh

(57) ABSTRACT

Optical systems, device, and methods including signal varying devices, such as optical amplifiers, attenuators, and filters that have controllable gain, loss and transparent intensity profiles, and which can include and be responsive to one or more local and remote controllers.

20 Claims, 12 Drawing Sheets

U.S. PATENT DOCUMENTS

| | | | |
|---|---|---|---|
| 5,530,583 A | 6/1996 | Uno et al. | |
| 5,541,766 A | 7/1996 | Mizrahi et al. | |
| 5,557,442 A | 9/1996 | Huber | |
| 5,579,143 A | 11/1996 | Huber | |
| 5,633,974 A | 5/1997 | Chia | |
| 5,636,301 A | 6/1997 | O'Sullivan et al. | |
| 5,651,085 A | 7/1997 | Chia | |
| 5,675,432 A | 10/1997 | Kosaka | |
| 5,694,512 A | 12/1997 | Gonthier et al. | |
| 5,696,615 A | 12/1997 | Alexander | |
| 5,717,510 A | 2/1998 | Ishikawa et al. | |
| 5,764,406 A | 6/1998 | Newhouse et al. | |
| 5,784,192 A * | 7/1998 | Sugiyama et al. | 359/341.42 |
| 5,812,710 A | 9/1998 | Sugaya | |
| 5,815,299 A | 9/1998 | Bayart et al. | |
| 5,861,981 A | 1/1999 | Jabr | |
| 5,880,866 A | 3/1999 | Stolen | |
| 5,883,736 A | 3/1999 | Oshima et al. | |
| 5,900,969 A | 5/1999 | Srivastava et al. | |
| 5,903,371 A | 5/1999 | Arecco et al. | |
| 5,903,385 A * | 5/1999 | Sugaya et al. | 359/341.42 |
| 5,920,423 A | 7/1999 | Grubb et al. | |
| 5,963,361 A | 10/1999 | Taylor et al. | |
| 5,999,548 A | 12/1999 | Mori et al. | |
| 6,031,646 A | 2/2000 | Sniadower | |
| 6,055,092 A | 4/2000 | Sugaya et al. | |
| 6,057,959 A | 5/2000 | Taylor et al. | |
| 6,081,366 A | 6/2000 | Kidorf et al. | |
| 6,122,298 A | 9/2000 | Kerfoot, III et al. | |
| 6,236,487 B1 * | 5/2001 | Stephens | 398/160 |
| 6,344,925 B1 | 2/2002 | Grubb et al. | 359/345 |
| 6,381,064 B1 * | 4/2002 | Terahara | 359/337.13 |

OTHER PUBLICATIONS

Dung, J.C. et al., Gain Flattening of Erbium Doped Fibre Amplifier Using Fibre Bragg Gratings, Electronics Letters, Mar. 19th, 1998, vol. 34, No. 6., Online No. 19980446.

Yu, A., et al., Analysis of Optical Gain and Noise Spectral Properties of Erbium–Doped Fiber Amplifier Cascade, Optical Amplifiers and their Application, Aug. 3–5, 1994, 1994 OSA Technical Digest Series, V14, pp. FB1–1–3/124–126.

Masuda, H., et al., Ultra–Wideband Optical Amplification with a 3–dB Bandwidth of 67 nm Using a Partially Gain Flattened Erbium–Doped Fiber Amplifier and Raman Amplification, Optical Amplifiers and their Application, Aug. 3–5, 1994, 1997 OSA Technical Digest Series, V20, pp. MC3–1–4/40–3.

Sugaya, Y., et al., Novel Configuration for Low–Noise and Wide–Dynamic–Range Er–Doped Fiber Amplifiers for WDM Systems, Optical Amplifiers and their Application, Jun. 15–17, 1995, 1995 OSA Technical Digest Series, V18, pp. FC3–1–4/158–161.

Jacobovitz–Veselka, G.R., et al., Single–Stage Booster Amplifier with Two 980 nm Pumps Stabilized by Fiber Gratings, Optical Amplifiers and their Application, Jun. 15–17, 1995, 1995 OSA Technical Digest Series, V18, pp. FC4–1–4/162–165.

Hansen, P.B., et al., Loss Compensation in Dispersion Compensating Fiber Modules by Raman Amplification, OFC'98 Technical Digest pp. 20–21.

Rottwitt, K., et al., Detailed Analysis of Raman Amplifiers for Long–Haul Transmission, OFC'98 Technical Digest pp. 30–31.

Chernikov, S.V., et al., 10 Gbit/s Error–Free Transmission of 2–ps Pulses Over A 45–km Span Using Distributed Raman Amplification at 1300 nm, OFC'98 Technical Digest p. 31.

Kawai, S., et al., Ultrawide 75 nm 3–dB Gain–Band Optical Amplifier Utilizing Erbium–Doped Fluoride Fiber and Raman Fiber, OFC'98 Technical Digest pp. 32–33.

Dianov, E.M., et al., Highly Efficient 1.3 $\mu$m Raman Amplifier, OFC'98 Technical Digest pp. 33–34.

Rottwitt, K., et al., A 92 nm Bandwidth Raman Amplifier, OFC'98, Post–Deadline Paper PD6–1–4.

Srivastava, A. K., et al., 1 Tb/s Transmission of 100 WDM 10 Gb/s Channels Over 400 km of TrueWave Fiber, OFC'98, Post–Deadline Paper PD10–1–4.

Masuda, H., et al., Ultra–Wideband Hybrid Amplifier Comprising Distributed Raman Amplifier and Erbium–Doped Fiber Amplifier, Electronics Letters, Jun. 25th, 1998, vol. 34., No. 13, Online No. 19980935.

Takano, K., et al., An Optical Pre–Amplifier with Automatic Gain Control Function, Proceedings of the 1995 IEICE General Conference, Mar. 27–30, 1995, Fukuoka, Fukuoka Institute of Technology b–1067, p. 513.

Zou et al., Compensation of Raman Scattering and EDFA's Nonuniform Gain in Ultra–Long–Distance WDM Links, IEEE Photonics Technology Letters, vol. 8, No. 1, Jan. 1996, pp. 139–141.

Stentz, A., et al., OSA Trends in Optics and Photonics, vol. 5, Optical Amplifiers and Their Applications. From the Topical Meeting, pp. 350–368, Published: Washington, DC, USA, 1996.

Wen, Senfar, et al., IEEE Phontonics Technology Letters, Feb. 1992, vol. 4, No. 2, New York, US, pp. 189–192, IEEE Log No.: 9105789.

Aide, K., et al., Long–Span Repeaterless IM/DD Optical Transmission Experiment over 300 KM using Optical Amplifiers, ICC '91, vol. 3, pp. 1228–1232, 1991, Published: New York, NY, USA.

Grubb, S. G., Raman Amplifiers for Broadband Communications, OFC '98, OSA Technical Digest Series vol. 2, 1998, abstract.

* cited by examiner

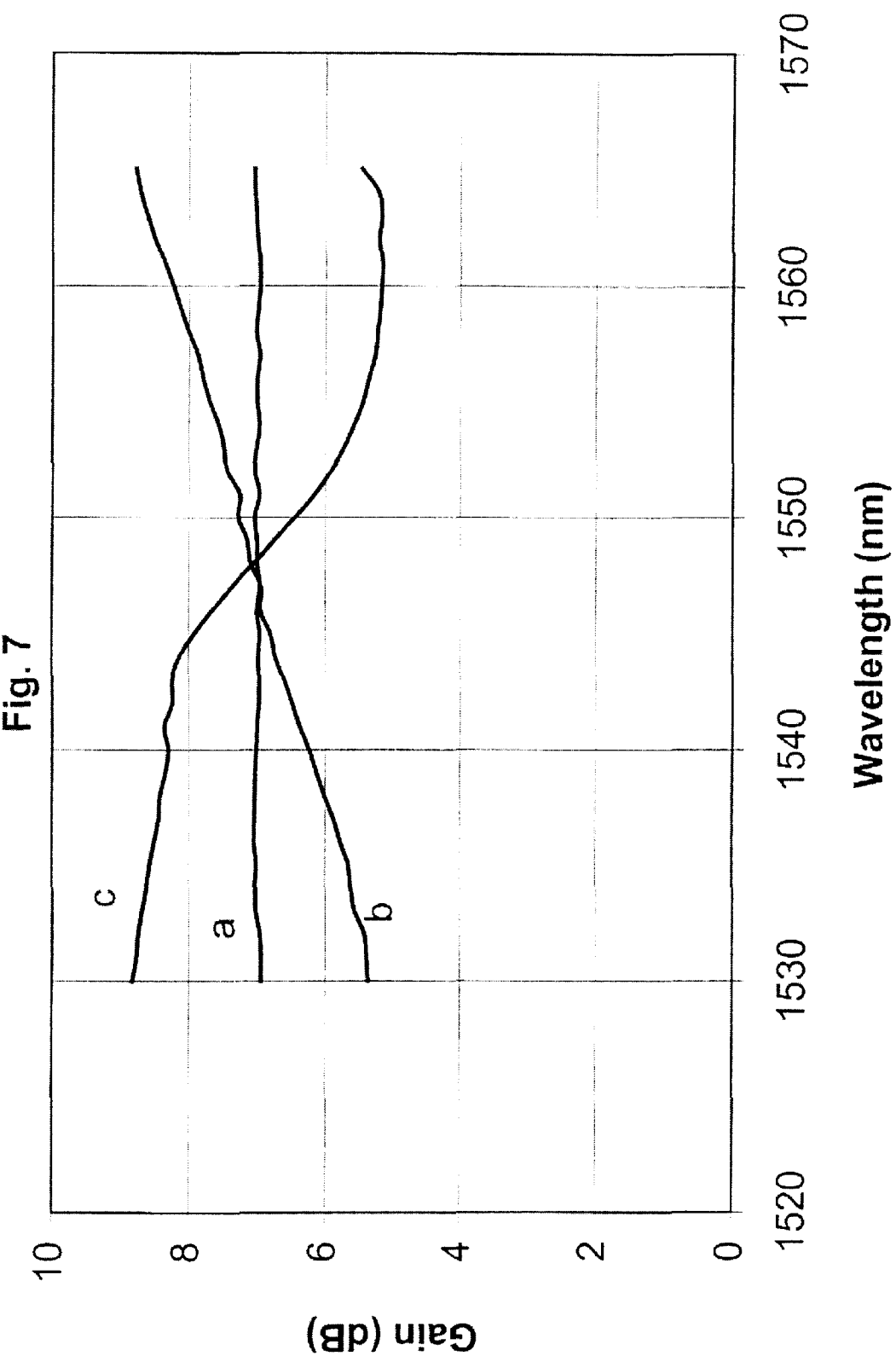

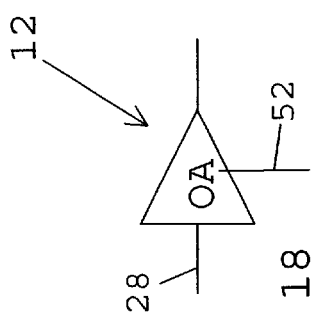
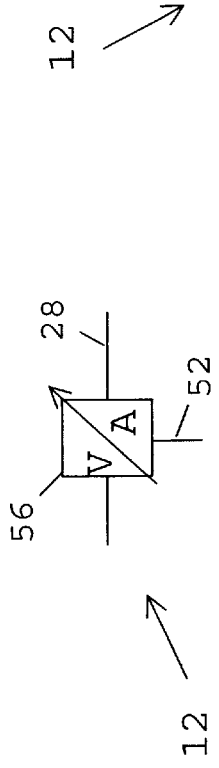
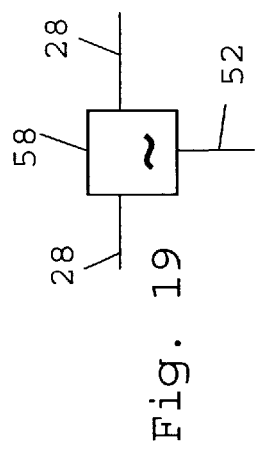
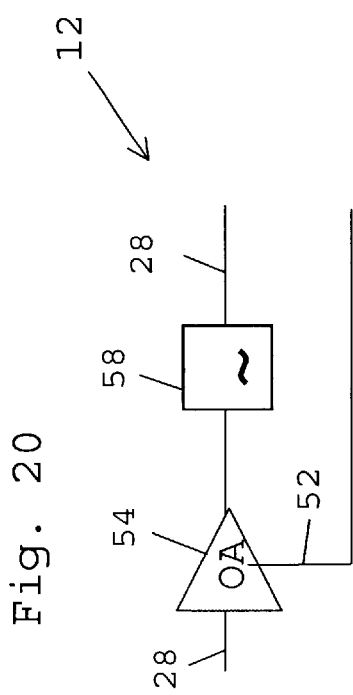
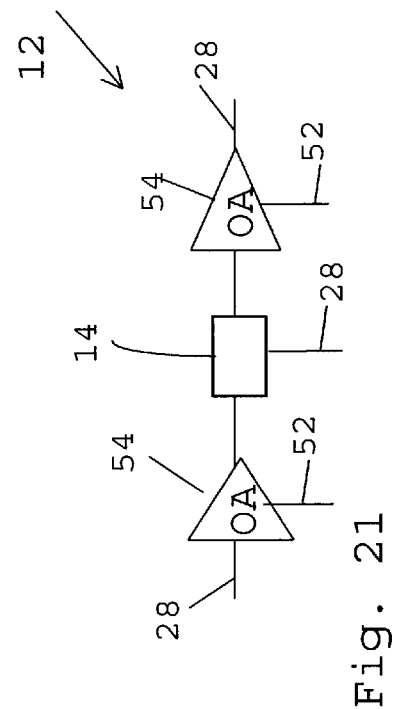

OPTICAL SIGNAL VARYING DEVICES, SYSTEMS AND METHODS

CROSS-REFERENCE TO RELATED APPLICATIONS

This application is a continuation-in-part and claims priority from commonly assigned U.S. application Ser. No. 09/119,561, filed Jul. 21, 1998 U.S. Pat. No. 6,236,487, and Ser. No. 09/544,487, filed Apr. 7, 2000 U.S. Pat. No. 6,282,002, which is a divisional of U.S. application Ser. No. 09/119,556, filed Jul. 21, 1998, now U.S. Pat. No. 6,115,174, issued Sep. 5, 2000, all of which are incorporated herein by reference.

STATEMENT REGARDING FEDERALLY SPONSORED RESEARCH OR DEVELOPMENT

Not Applicable.

FIELD OF THE INVENTION

The present invention is directed generally to optical transmission systems, devices, and methods that provide for controllably varying characteristics of optical signals passing through the system. More particularly, the invention relates to optical systems, device, and methods including signal varying devices, such as optical amplifiers, attenuators, and filters that have controllable gain, loss and transparent intensity profiles, and which can include and be responsive to one or more local and remote controllers.

BACKGROUND OF THE INVENTION

The continued development of digital technology has provided electronic access to vast amounts of information. The increased access to information has fueled an increasing desire to quickly obtain and process the information. This desire has, in turn, driven demand for faster and higher capacity electronic information processing equipment (computers) and transmission networks and systems linking the processing equipment (telephone lines, cable television (CATV) systems, local, wide and metropolitan area networks (LAN, WAN, and MAN)).

In response to this demand, telecommunications companies have turned to optical communication systems to provide substantially larger information bandwidth transmission capacities than traditional electrical communication systems. Early optical transmission systems, known as space division multiplex (SDM) systems, transmitted one information signal using a single wavelength in a waveguide, i.e. fiber optic strand. Time division multiplexing (TDM) multiple information signals onto a single wavelength in a known sequence that can be separated upon receipt has further increased the transmission capacity of optical systems.

The continued growth in traditional communications systems and the emergence of the Internet as a means for accessing data has further accelerated the demand for higher capacity communications networks. Telecommunications companies have looked to wavelength division multiplexing (WDM) to further increase the capacity of their existing systems. In WDM transmission systems, pluralities of distinct TDM or SDM information signals are carried using electromagnetic waves having different wavelengths. The pluralities of information carrying wavelengths are combined into a multiple wavelength signal, which is transmitted in a single waveguide. In this manner, WDM systems can increase the transmission capacity of existing SDM/TDM systems by a factor equal to the number of wavelengths used in the WDM system.

Optical WDM systems were not initially deployed, in part, because high cost electrical signal regeneration/amplification equipment was required for each optical wavelength throughout the system. However, the development of the erbium doped fiber optical amplifier (EDFA) eliminated the need for electrical signal regeneration/amplification equipment and the associated costs in many systems, thereby making WDM a cost effective means to increase network capacity.

Erbium doped fiber amplifiers ("EDFAs") can theoretically be used to amplify signals in an amplification wavelength range spanning from approximately 1500 nm to 1600 nm. However, EDFAs do not equally amplify each optical signal wavelength within the range. The differences in amplification can result in attenuation of some signals and/or signal loss or distortion because of highly amplified noise. Thus, the performance of EDFAs in a transmission system varies depending upon the number of wavelengths and the wavelengths used in the system.

Judicious selection of the wavelengths and amplifier powers used in a system can minimize EDFA variations (gain non-uniformities). For example, many WDM systems currently restrict the wavelengths used in the system to between 1540 nm and 1560 nm, a range in which EDFAs comparably amplify optical signals. As might be expected, restricting system designs to only those wavelengths that are comparably amplified by EDFAs severely limits the number of wavelengths and the information transmission capacity of WDM systems.

The number of wavelengths in the system can be increased to some extent, if only a small number of amplifiers are used in the system. The small number of amplifiers allows wavelengths having differing EDFA amplification characteristics to be used, because the cumulative amplifier variations do not swamp out lowly amplified signals.

In addition to the wavelength dependence, EDFA performance is also a function of the amplification power supplied to the EDFA. Thus, EDFAs generally must be operated with a limited power range to minimize amplification variations in the system. The amplifier power limitations, in turn, increase the number of amplifiers in a system by limiting the allowable distance between EDFAs, i.e., the span length.

In discussing the signal intensity variation of EDFAs and other devices, the uniformity of gain or loss profiles over a wavelength range is generally referred to as the flatness of the profile. A perfectly flat profile is a gain, loss, or transparency profile that has a constant value over the wavelength range of interest.

WDM system constraints imposed by EDFA wavelength variations have focused attention on providing EDFA configurations that compensate for the variations and provide more uniform gain for a larger band of wavelengths and over a greater power range. Various EDFA configurations have been proposed to minimize amplifier gain variations. For example, see U.S. Pat. Nos. 5,406,411, 5,541,766, 5,557, 442, 5,636,301, and 5,696,615; Sugaya et al., Optical Amplifiers and Their Applications, Technical Digest OSA 1995 v. 18, pp. 158–161/FC3-1; Jacobovitz-Veselka et al., Optical Amplifiers and Their Applications, Technical Digest OSA 1995 v. 18, pp. 162–165 /FC3-1; Park et al., Electronics Letters, Mar. 5, 1998, Vol. 34, No. 5, Online No. 19980346; and, Dung et al., Electronics Letters, 19 Mar. 1998, v. 34, n. 6, Online No. 19980446.

Other amplifier configurations have used EDFAs in combination with a Raman amplifier to statically vary the gain profile of an EDFA. For example, see Masuda et al., OSA 1997, pp. 40–3/MC3-1, Masuda et al., Electronics Letters, v34, n13, Online No. 19980935 (Jun. 25, 1998 ), and U.S. Pat. No. 5,083,874 issued to Aida et al. It has also been proposed to eliminate EDFAs and use amplifier configurations that employ only Raman amplifiers. However, the all-Raman configurations to date have not greatly improved the amplifiers gain flatness profile and may still require gain equalization to flatten the gain profile as discussed by Rottwitt et al., "A 92 nm Bandwidth Raman Amplifier", OFC '98, p. 72 /CAT-1.

The above referenced gain flattened configurations are generally statically configured to have a wavelength range defined by a 3 dB variation (~ a factor of 2) in the gain profile and having a ±1 dB variation between wavelengths. The gain flattened amplifiers provide some improvement over conventional EDFAs in the number of amplifiers, amplifier power ranges, and span lengths before the signal must be regenerated. The gain flattened optical amplifiers nonetheless introduce excess amplifier noise and gain non-uniformities that limit the number of optical amplifiers that can be used in a WDM system prior to signal regeneration.

Gain flattening in optical amplifier configurations is generally performed using filters and/or attenuators to decrease the signal intensity of the wavelengths to a specified value. For example, in many embodiments, the optical signals are amplified to an intensity higher than the amplifier output value and the filters and attenuators are used to flatten the gain profile by decreasing the optical signal intensity. These methods tend to increase the noise in the signal with a corresponding decrease in the output power of the device.

Optical filters and attenuators can be separate optical devices added to the system or all-fiber devices, such as Bragg grating filters and all-fiber attenuators as discussed in U.S. Pat. Nos. 4,728,170, 5,095,519, 5,633,974, 5,651,085, and 5,694,512. The filters and attenuators can be variable or fixed depending upon the configuration. The amplifier, filters, and attenuators are configured statically to flatten the gain profile.

As the demand for transmission capacity continues to increase, there is an increasing need for systems that cover longer distances and provide for an increasing number of information carrying wavelengths/channels. Thus far, it has proven difficult to balance the non-linear gain of EDFA configurations with selective wavelength filtering and attenuation to provide gain flattened amplifier configurations that meet this need.

Accordingly, there is a need for optical amplifiers and attenuator particularly, and signal varying devices generally, that provide increased control over the intensity profile of optical signal in the optical systems. The improved signal varying devices will provide for higher capacity, more versatile, longer distance communication systems.

BRIEF SUMMARY OF THE INVENTION

The apparatuses and methods of the present invention address the above difficulties with prior art optical devices and systems. In one embodiment, an optical system of the present invention includes a plurality of optical processing nodes in optical communication via at least one signal varying device. The signal varying devices can include one or more devices, such as amplifiers, attenuators, and filters.

In another embodiment, the signal varying device includes an optical fiber suitable for facilitating gain and/or attenuation, such as through Raman scattering/gain or the use of an EDFA, in a signal wavelength range. The signal varying device can also include a pump energy source for providing pump energy in a plurality of pump wavelengths, and a local controller to perform functions such as monitoring signal characteristics and ensuring the pump source provides sufficient pump energy in each pump wavelength to stimulate a desired amount of Raman scattering/gain and/or to pump an erbium doped portion of the optical fiber.

The pump wavelengths can be selected such that the combined Raman gain resulting from the pump energy supplied by each pump wavelength produces a desired signal variation profile in the signal wavelength range. In addition, the pump energy supplied by at least one of the pump wavelengths can be dynamically varied to produce a controlled signal intensity variation profile over the signal wavelength range in the optical fiber. In one embodiment, four pump wavelengths spaced in 10–30 nm intervals can be used to provide intensity gain and flatness control to over 30 nm to within ±0.2 dB.

In another embodiment, erbium doped fiber can be used in combination with a Raman amplifier stage to provide a multiple stage signal varying device. The erbium doped fiber and the Raman portion of the signal varying device can be operated in conjunction to impart a desired intensity profile to the optical signal.

The design and length of the optical fiber used in conjunction with the pump source can be tailored to provide flexibility in operation of the system. For example, a concentrated, or lumped, high gain signal varying device can be provided using a small core fiber, such as dispersion compensated fiber. The lumped device further provides for a greater range over which the signal varying device can be used as an attenuator because of its higher loss. In addition, a distributed low gain signal varying device can be provided using a lower attenuation transmission fiber that can provide control over a smaller intensity variation range. The concentrated and distribution signal varying devices can be used alone or in combination to statically or dynamically impart desired signal varying characteristics to the system.

In another embodiment of the present invention, one or more controllers remote from one or more signal varying devices can monitor characteristics of optical signals and control the signal varying devices. In that way, the remote controllers can, for example, monitor signals at the end of a link and control the signal varying devices in that link in order to provide for a desired signal characteristic. The remote controllers can be used alone or in conjunction with the signal varying devices and local controllers described hereinabove. In this manner, the signal intensity over a range of wavelengths can be controlled using the signal varying devices and/or remote controllers of the present invention.

Accordingly, the present invention addresses the aforementioned problems and provides signal varying devices and methods that provide increased control over optical signal characteristics in an optical system. These advantages and others will become apparent from the following detailed description.

BRIEF DESCRIPTION OF THE DRAWINGS

Embodiments of the present invention will now be described, by way of example only and not for purposes of limiting the same, with reference to the accompanying figures, wherein:

FIGS. 6a, 6b, 7, and 8 show Raman gain profiles;

FIGS. 13–21 show several embodiments of signal varying devices according to the present invention.

DETAILED DESCRIPTION OF THE INVENTION

Figure 1:
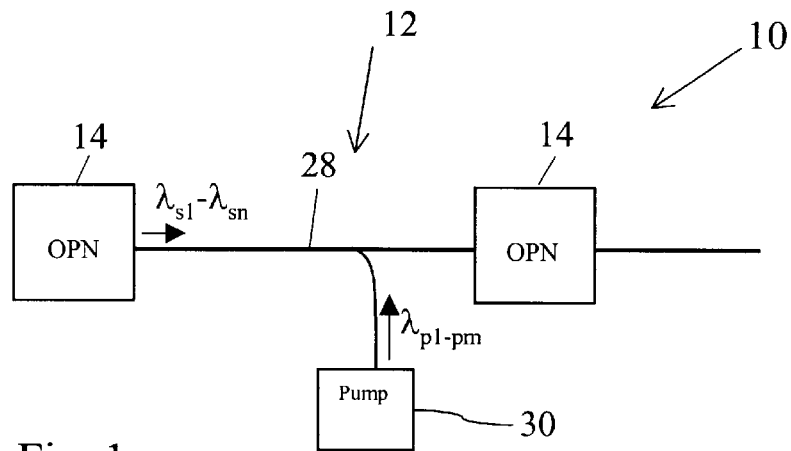
FIGS. 1–2 shows two embodiments of optical communication systems according to the present invention.
Figure 2:
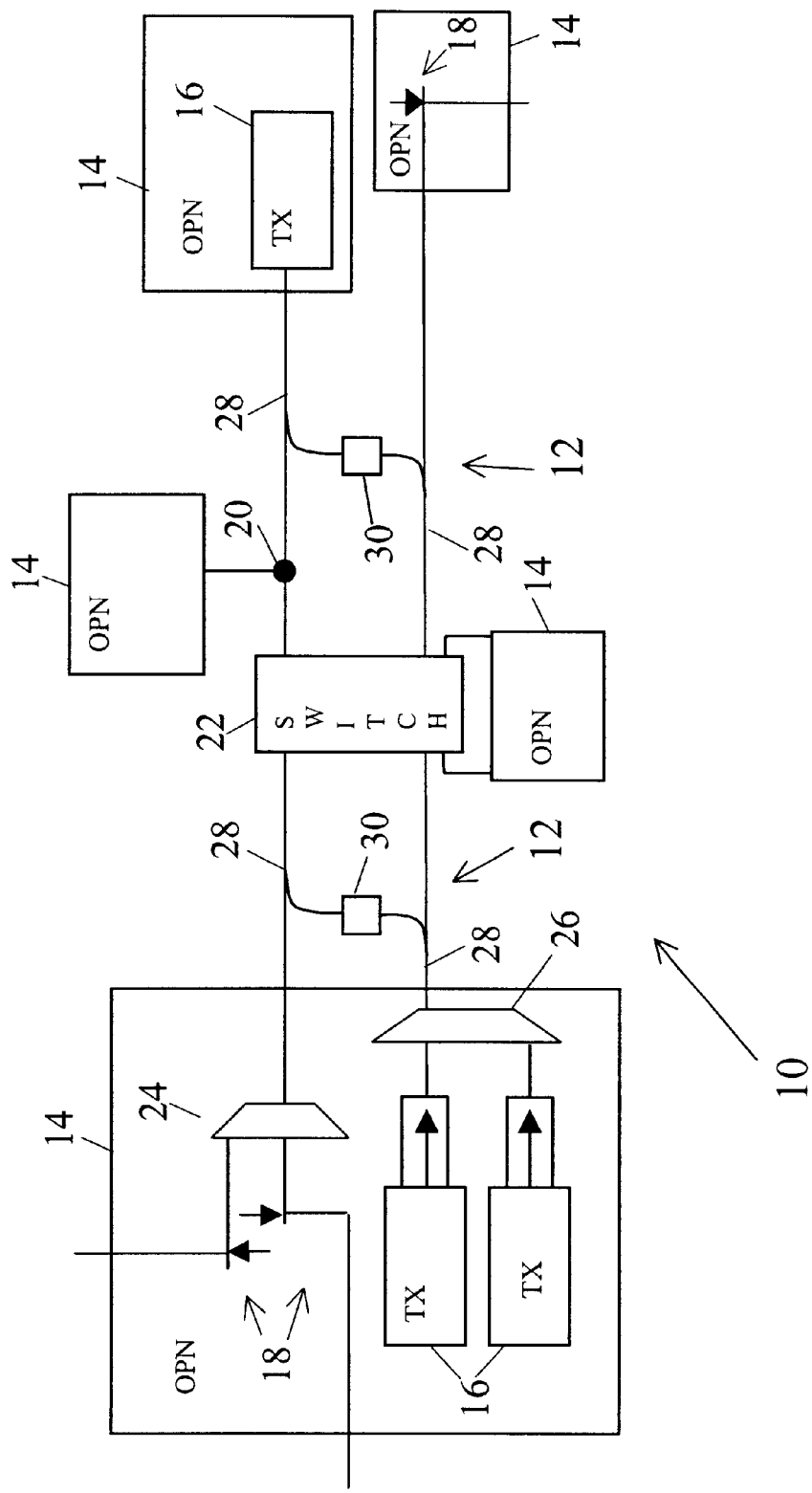

FIGS. 1 and 2 show embodiments of optical systems 10 in which signal varying devices 12 are optically connected between optical processing nodes 14. The system 10 can be embodied, for example, as one or more point to point links, as one or more rings, as a mesh architecture, or in one or more other system 10 architectures.

The optical processing nodes 14 can include one or more optical processing devices, such as transmitters 16, receivers 18, add and/or drop ports 20, switches 22, signal splitters 24 and combiners 26, or other signal processing devices. The optical processing nodes 14 generally include at least one transmitter 16 for transmitting optical signals in at least one information carrying wavelength to at least one optical signal receiver 18 located in another processing node 14. The transmitters 16 can include one or more light sources or emitters, such as lasers, incoherent sources, or other sources to provide optical channel power. Likewise, the receivers 18 can employ direct or indirect (e.g. coherent) detection equipment, such as photodiodes and wavelength selective devices as are known in the art, corresponding to the number of wavelengths to be received.

The signal varying devices 12 can include one or more amplifiers, attenuators, filters, and the like for varying optical signals, and can include doped or undoped fiber 28 in optical communication with the processing nodes 14 and can include one or more pump energy sources 30. The device 12 can be used in combination with linear and/or inherently nonlinear or nonlinearly operated components, such as one or more erbium doped fiber amplifiers, to produce a net linear intensity profiles or different non-linear profiles. Although the present invention will be described in terms of signal varying devices 12 connected between optical processing nodes 14, signal varying devices 12 of the present invention can also be located within optical processing nodes 14.

The signal varying devices 12 can be operated in one or more signal varying modes, which include amplification, attenuation, and lossless mode. By controlling the pump 30 power, one signal varying device 12 can be continuously transitioned between the three modes of operation. In addition, the intensity gain/loss profile can be adjusted in each signal varying device 12 to dynamically control the characteristics of the optical signals exiting the signal varying device 12. It is also possible to operate the signal varying device 12 in more than one mode at the same time. For example, the signal varying device 12 can be operated as an amplifier over part of the signal wavelength range and as an attenuator and/or a lossless link over the remaining part of the signal wavelength range. The multiple mode operation of the signal varying device 12 can be used, for example, to compensate for optical signals that enter the signal varying device 12 with a non-linear intensity profile.

Two or more signal varying devices 12 can be operated with different pump wavelengths and/or powers to provide a cumulative signal variation profile differing from the signal variation profiles of the individual devices 12. For example, the pump wavelengths used in different devices 12 can be varied to compensate for signal variation profile non-uniformities in individual devices 12 and to provide a cumulative signal variation profile that is substantially more uniform, or otherwise more desirable, than the individual device profiles. Unlike prior art systems, the present invention does not require that a number of non-linear devices be coordinated and controlled to provide linear intensity variation (gain/loss) profiles. Instead, the present invention can provide an optical system 10 incorporating a continuous transition signal varying device 12 that provides increased control over the characteristics of optical signals being transmitted in the system 10.

The fiber 28 in the signal varying device 12 can be selected to facilitate Raman scattering/gain or be doped, such as with a rare earth element like Erbium, Ytterbium, other rare earth elements, and combinations thereof, which when properly pumped facilitate signal amplification over a range of transmission wavelengths that include optical signal wavelengths $\lambda_{s1}$–$\lambda_{sn}$. Although the pumps 30 and fiber 28 will generally be described in terms of Raman amplifiers, they can also be embodied as other amplifiers, such as EDFAs.

The fiber 28 used in the signal varying device 12 can be the same as the transmission fiber 28 in the system 10, or it can be another type of fiber having properties that differ from the transmission fiber in the system 10. The length and type of fiber deployed in the system 10 can be tailored to provide flexibility in the operation of the system. For example, the extent of Raman scattering in the fiber is partly dependent upon the size of the fiber core. In addition, the loss in the fiber increases as the size of the core decreases. Thus, a concentrated, or lumped, high gain/loss signal varying device can be provided using a small core fiber.

In one embodiment, a small core dispersion compensated fiber ("DCF"), such as is manufactured by Lucent Technologies and Corning Incorporated, is used to produce a concentrated signal varying device 12. The DCF concentrated device 12 provides for a greater range over which the signal varying device can be used as an attenuator, an amplifier, or a transparent link, because of the high attenuation/high gain properties of the DCF. Conversely, a distributed low gain signal varying device 12 can be provided using a lower attenuation transmission fiber that provides for intensity control over a smaller intensity variation (gain/loss) range.

Figure 3A:
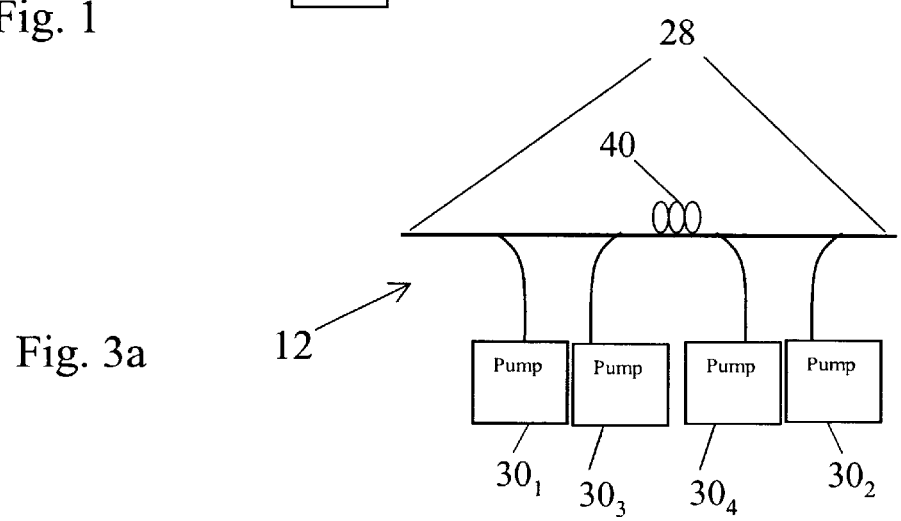
FIGS. 3–5 show several embodiments of signal varying devices according to the present invention.
Figure 3B:
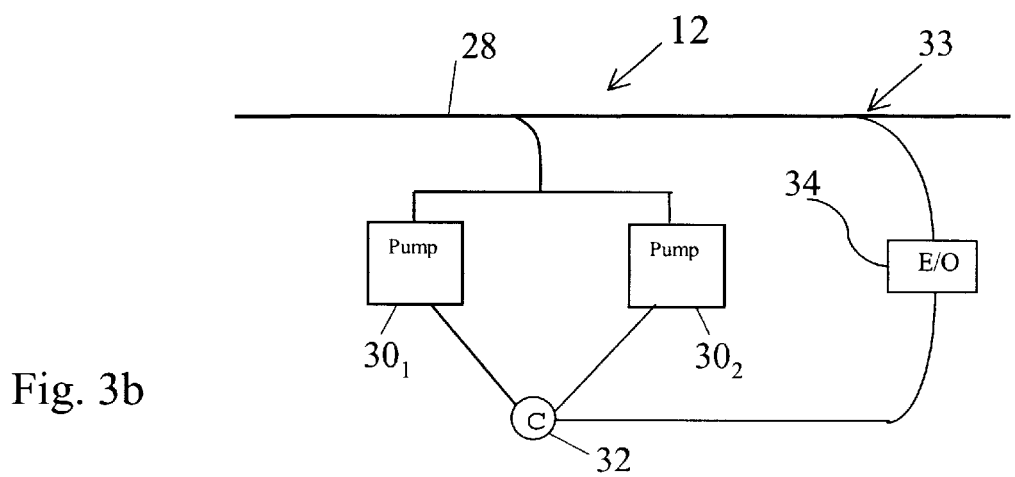

The pump energy sources 30 in the signal varying devices 12 can provide pump energy to the fiber 28 in one or more pump wavelengths, $\lambda_{p1}$–$\lambda_{pm}$. The pump energy can be supplied to the fiber 28 counter-directionally and/or codirectionally with the direction of the travel of the optical signals $\lambda_{s1}$–$\lambda_{sn}$ being transmitted in the system 10. In addition, the pump source 30 can supply the pump energy at one or more points along the fiber 28, as shown in FIG. 3a. In at least one embodiment, the pump energy is supplied from one point on the fiber 28 in a direction counter to the optical signal, as shown in FIG. 3b. This configuration tends to lessen pump and signal-pump separation complexity and interference between the pump energy and the optical signal.

The pump source 30 can be any source of pump energy that is sufficient to induce gain in the transmission wavelength range of the system 10. Typically, the pump source 30 will include one or more pump lasers of the type known in the art, and may also include other coherent and incoherent sources. The number of lasers and other pump energy sources used in the pump source 30 depends upon the transmission wavelength ranges over which the signal varying device 12 will be operated.

The pump wavelengths can be selected such that the combined gain resulting from the pump energy supplied by each pump wavelength produces a desired gain signal variation profile in the transmission wavelength range. The gain signal variation profile can be uniform or nonuniform, linear or nonlinear depending upon a particular application of the device 12. The number of pump wavelengths and the wavelength spacing used in the device can be varied to provide gain over a range of wavelengths. The pump wavelengths, $\lambda_{p1}$–$\lambda_{pm}$, are generally selected to provide sufficient overlap of the gain profiles to provide control over the gain at one or more wavelengths in the transmission wavelength range.

The pump energy supplied by at least one of the pump wavelengths can be varied controllably to change the signal variation profile over the wavelength range in the fiber. Also, the total pump energy supplied via all the pump wavelengths can be held constant or varied accordingly. One skilled in the art will appreciate that the choice of wavelength can be made to tailor the signal varying characteristics of the device 12 to a particular system configuration.

The pump wavelengths, $\lambda_{p1}$–$\lambda_{pm}$, are typically selected so that the Raman scattered light intensity/gain profile will be substantially uniform over the range of wavelengths. One skilled in the art will appreciate that decreasing the spacing intervals of the pump wavelengths can increase the uniformity of the intensity profile. However, the increased uniformity must be balanced with the increased cost of using additional wavelengths in the device 12 and allowable total power requirements.

With proper pump wavelength selection, it is expected that Raman gain can be provided across the fiber transparent transmission wavelength range, which currently ranges from approximately 1240 to 1650 nm for silica based fiber. For example, in the transmission signal wavelength range of 1520 nm to 1620 nm, the corresponding pump wavelength range is approximately 1420 nm to 1510 nm. Likewise, in the transmission signal wavelength range of 1250 nm to 1350 nm, the corresponding pump wavelength range is 1120 nm to 1240 nm. It is also expected that changes in the fiber transmission wavelength range can be accommodated by the present invention by proper selection of pump wavelengths.

According to the present invention, signal varying devices 12 having the same or different signal variation profiles and employing the same or different pump wavelengths can be used in combination within the system 10. The pump energy supplied via each pump wavelength can be controlled, such as to compensate for self-pumping that might occur between the pump wavelengths, or to compensate for other variations in the system 10, as will be described in more detail hereinbelow.

FIG. 3a shows one embodiment of the signal varying device 12 including Erbium doped fiber 40 and which includes both EDFA and Raman amplifiers pumped at multiple locations. In that embodiment, EDFA and Raman amplification is accomplished by both counter pumping and co-pumping the EDFA and Raman amplifiers. In other embodiments, only counter pumping, only co-pumping, or combinations thereof can also be used. In another embodiment, the signal varying device 12 can include fiber 40 doped with materials other than Erbium, such as Ytterbium, other rare earth elements, and combinations thereof.

FIG. 3b shows one embodiment of the signal varying device 12 including a local controller 32 to monitor one or more characteristics of the optical signals in the fiber 28 and to control the device 12, such as by controlling the pump energy supplied via one or more of the pump energy sources 30. The local controller 32 can also be used to control devices other than amplifiers, such as variable attenuators and filters. The local controller 32 can be connected to the fiber 28, such as via an optical tap 33 and an electrical to optical converter 34. The local controller 32 can monitor the signals on an individual wavelength basis or in one or more groups of wavelengths. The local controller 32 can use one or more devices, such as optical spectrum analyzers, to monitor the wavelengths.

The local controller 32 can monitor one or more characteristics of the optical signals and provide for dynamic control over the signal varying devices 12 to compensate for variations in the system 10. Typical system 10 variations include the number of wavelengths/channels being used in the system 10, signal processing occurring at the processing nodes 14, environmental conditions, and replacement or degradation of system components. The local controller 32 also allows the signal varying devices 12 to be roughly calibrated prior to insertion into the system 10, and then to be dynamically adjusted under the actual operating conditions of the system 10 to provide the desired performance.

One form of dynamic control that can be exercised by the local controller 32 is control of the pump energy sources 30, which allow for the performance of the device 12 to be varied, such as when signal transmission changes occur upstream of the device 12. Thus, the dynamic control provides the ability to continually or periodic modify the operation of the devices 12 in response to communication system 10 variations that inevitably occur over time. For example, the performance of the device 12 can be varied so as to maintain a gain profile, to change to a different gain profile, to compensate for changes in the system 10, to maintain a minimum signal to noise ratio, etc. In one embodiment, the device 12 can be set to maintain a uniform gain profile and then to periodically monitor its performance and make appropriate adjustments as required, such as to vary the pump power to compensate for variations in the total signal power.

Figure 4:
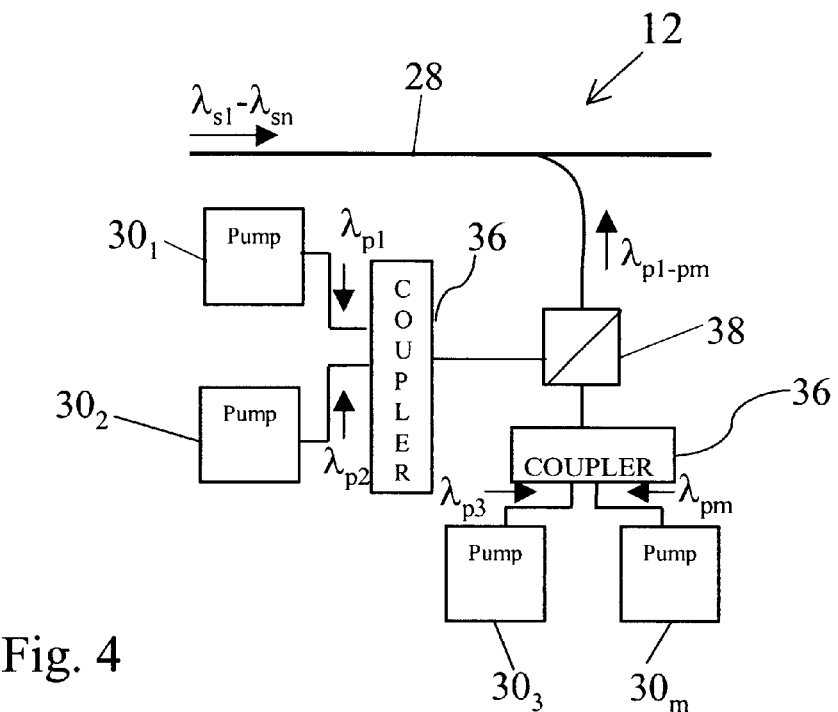

FIG. 4 shows one embodiment of the signal varying device 12 which is configured to combine arbitrarily spaced pump wavelengths. Grating stabilized lasers 30 emit pump wavelengths that are combined in pairs using fused DWDM couplers 36. The paired pump wavelengths can be further combined with arbitrarily spaced pump wavelengths using a dichroic filter 24. It will be appreciated that additional wavelengths can be added by cascading the lasers 30 and wavelength combining arrangements.

Figure 5:
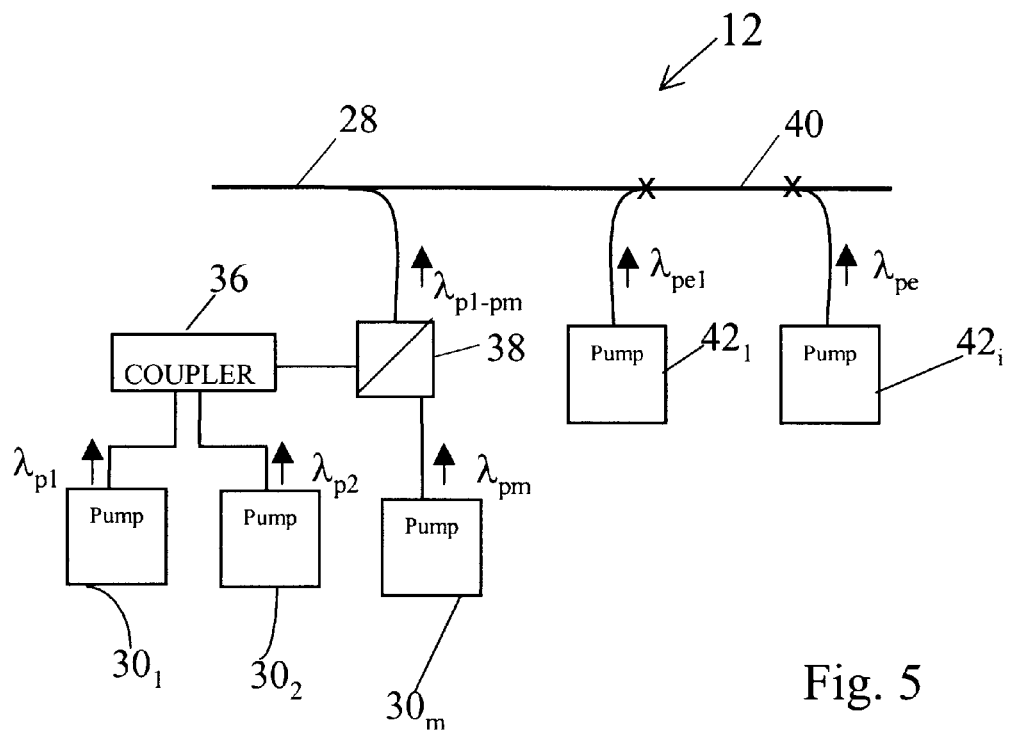

FIG. 5 shows another embodiment of the signal varying device 12 including both Raman and Erbium doped fiber 40 amplification. In that embodiment, the signal varying device 12 can provide non-linear intensity profiles. For example, an erbium doped fiber 40 that is optically pumped using wavelengths, $\lambda_{pe1}$–$\lambda_{pei}$, supplied by one or more erbium pump sources 42$_i$, can be used in combination with the Raman portion of the signal varying device 12 to provide a multiple stage signal varying device 12. It will be appreciated that various EDFA configurations, such as those discussed in the Background, can be used in embodiments incorporating erbium doped fiber.

Figure 6A:
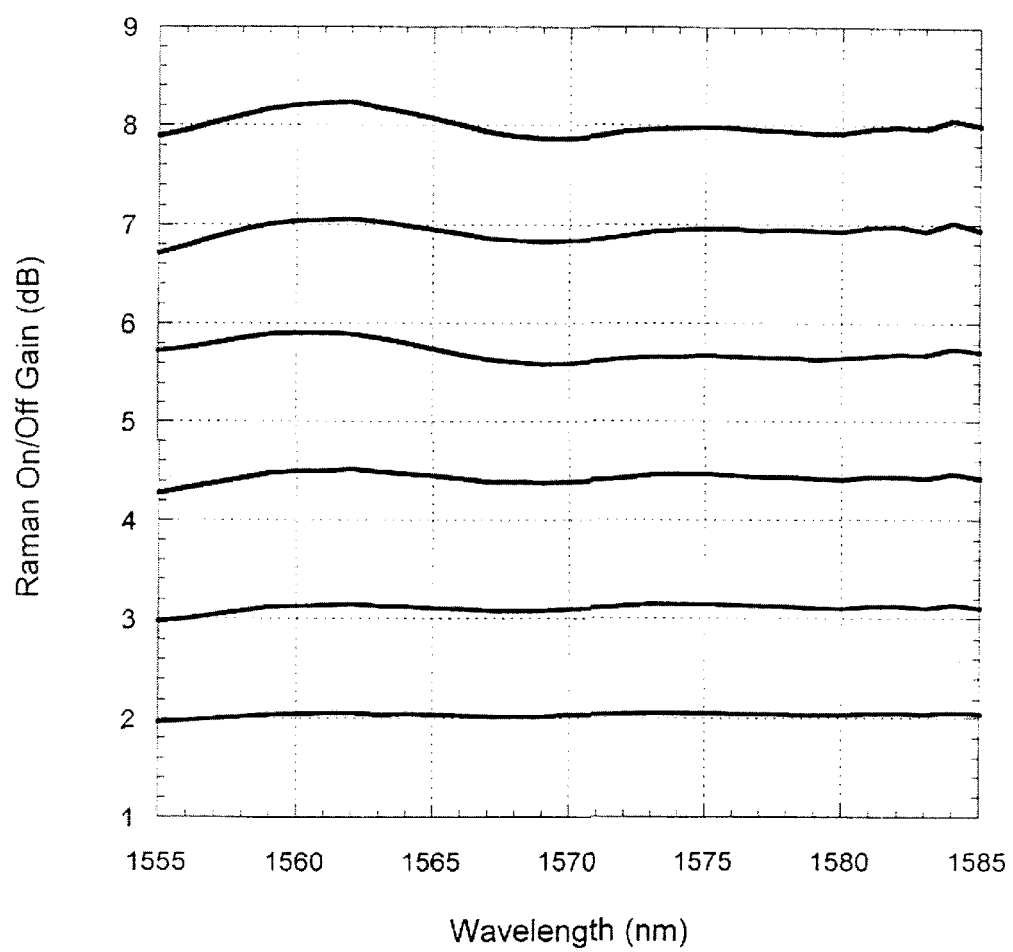
Figure 6B:
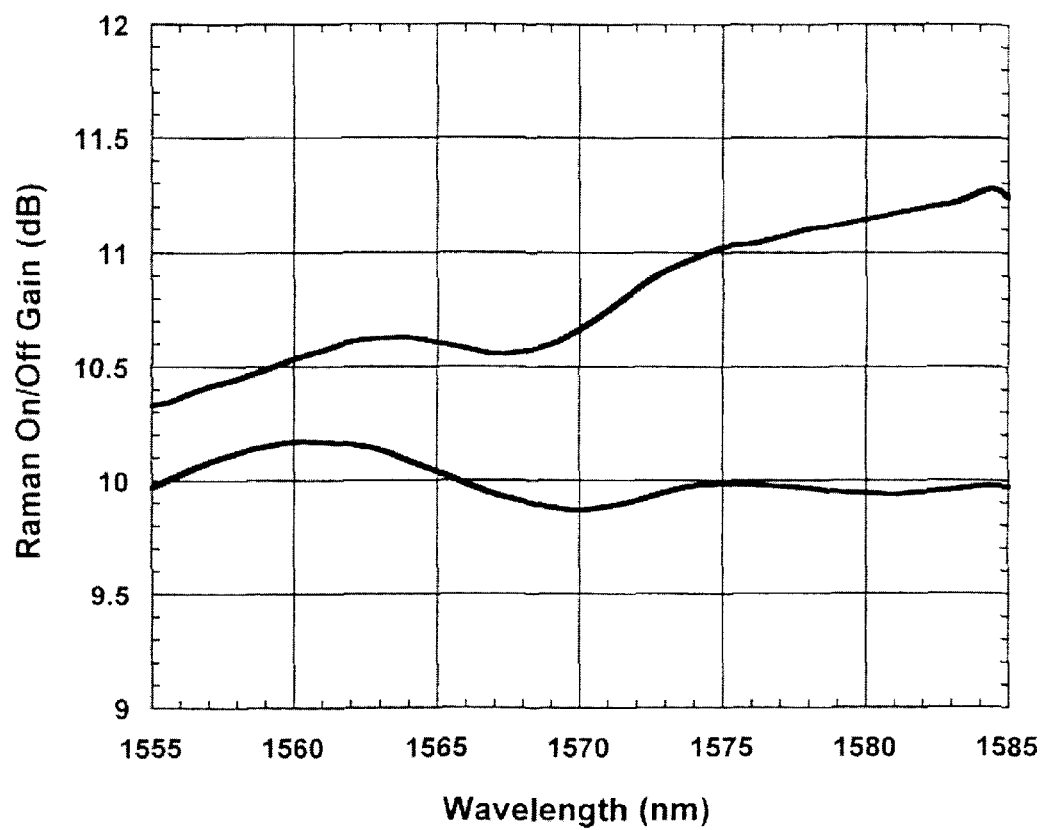
Figure 8:
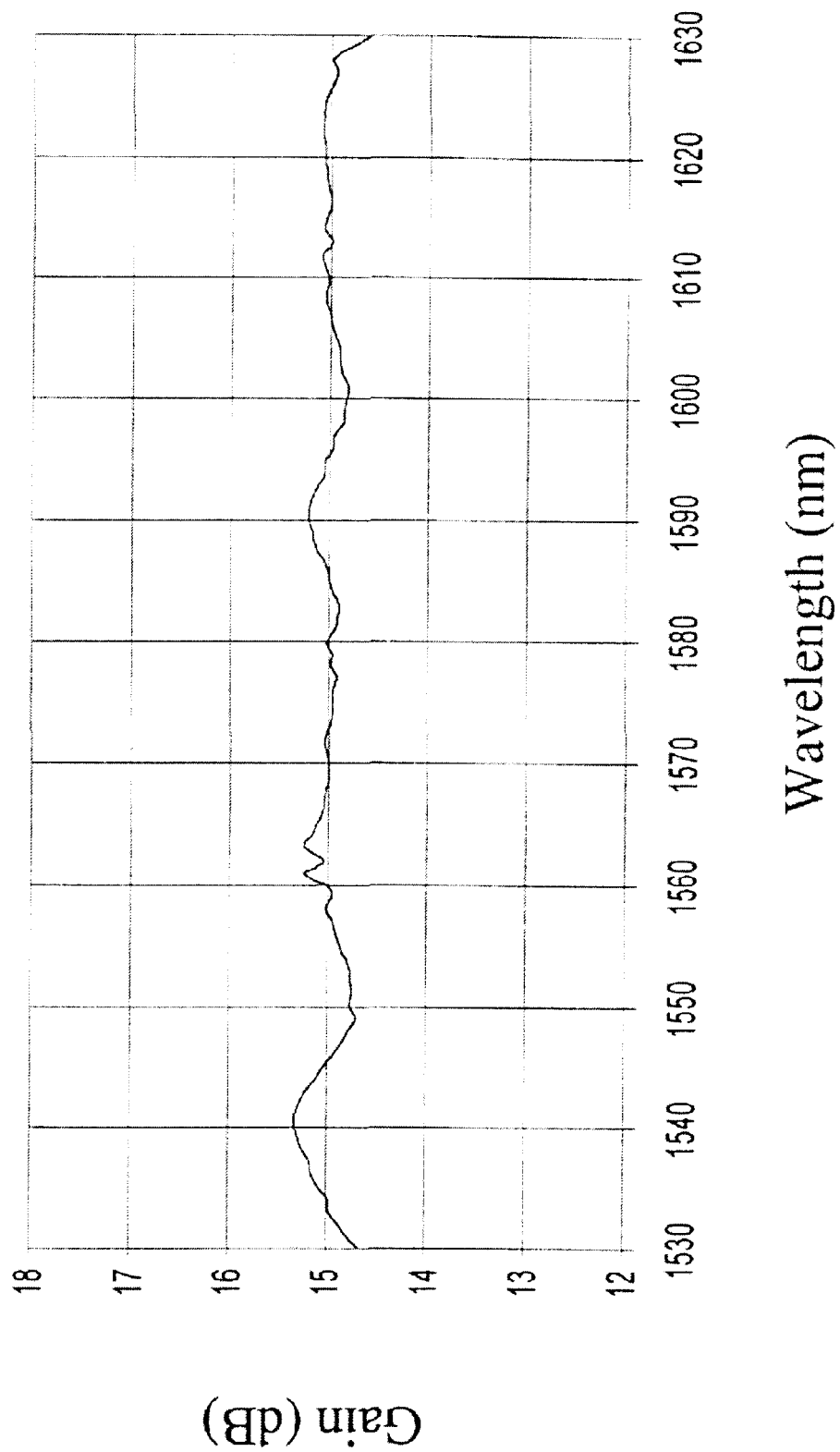

FIGS. 6a, 6b, 7, and 8 show exemplary Raman gain profiles that can be produced using various embodiments of the present invention. In one embodiment, the signal varying device 12 shown in FIG. 4 utilized four pump wavelengths (1450, 1460, 1485, and 1495 nm), which were combined using two 20 nm DWDM couplers and a dichroic filter. The combined pump wavelengths were supplied to DCF to provide Raman gain in the transmission signal wavelength range of 1555 to 1585 nm. As shown in FIG. 6a, substantially flat Raman gain signal variation profiles (±0.16 dB) can be produced over a 30 nm range for gains ranging from 1 to 8 dB. In addition, the relative power of the pump wavelengths supplied to the device 12 can be varied to produce non-linear profiles that generally increase or decrease across the signal wavelength range, as shown in FIG. 6b.

Experimental gain profiles were determined for a number of additional pump wavelengths. Based on the experimental results, Raman signal varying device simulations were performed over 35 nm wide (1530–1565 nm) and 100 nm wide (1530–1630 nm) signal wavelength ranges. The predicted performance of ±0.12 dB and ±0.342 dB over the 35 nm and 100 nm wavelength ranges, as shown in FIGS. 7 (curve a) and 8, respectively, indicates that the signal varying devices of the present invention can be used over a wide range of wavelengths to accommodate numerous channels. FIG. 7 (curves b and c) also shows examples of linear and non-linear profiles that can be produced by varying the relative power at the various pump wavelengths. It is also expected that the number of pumps and the pump wavelength spacing can be further varied to provide a range of signal variation profiles over wide and narrow wavelength ranges.

Figure 9:
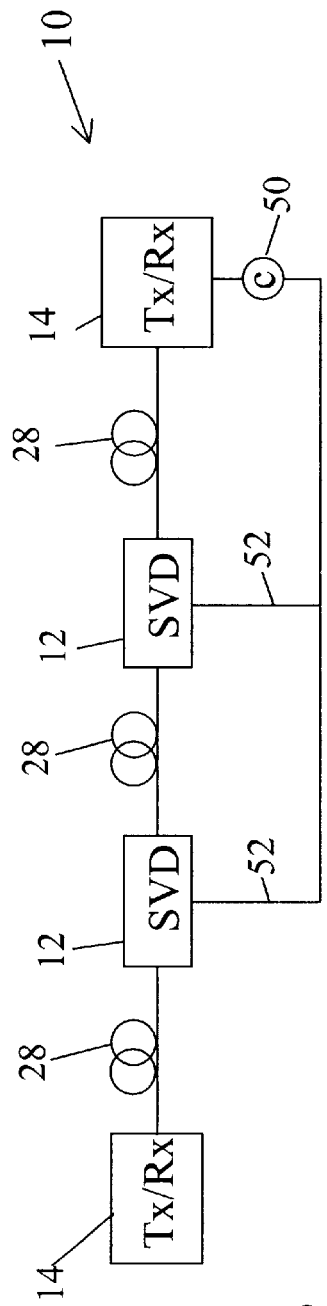
FIGS. 9 and 10 show two embodiments of systems including remote controllers according to the present invention.
Figure 10:
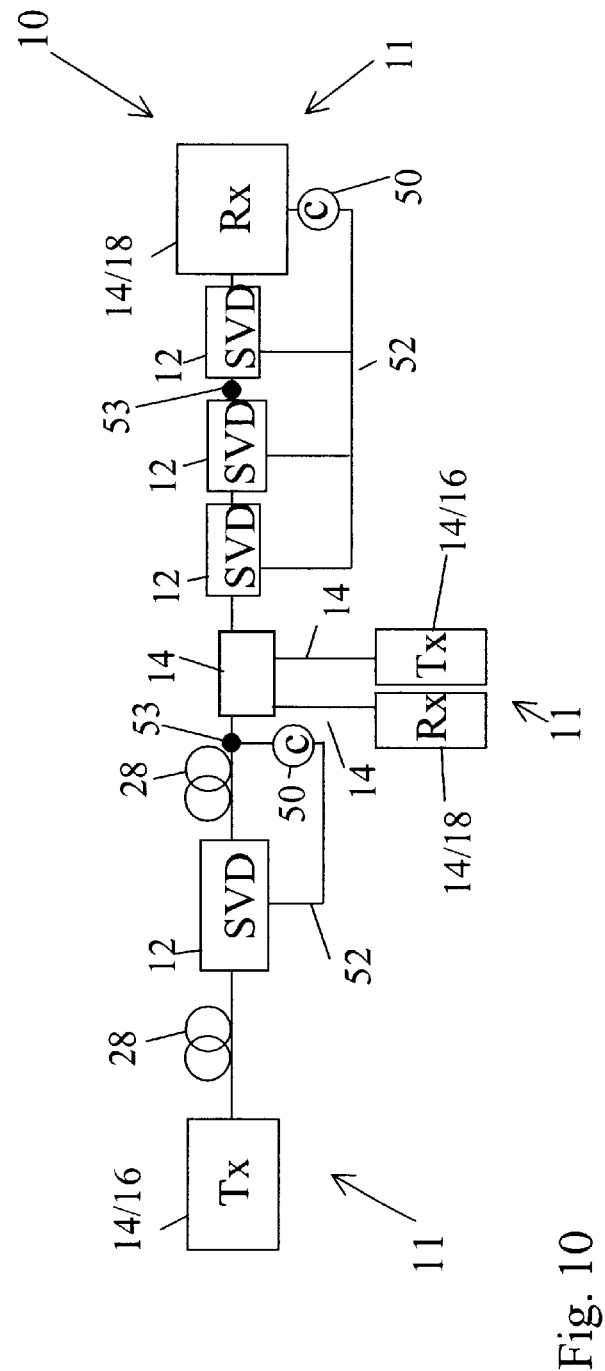

FIGS. 9 and 10 show embodiments of the system 10 which include at least one remote controller 50 used in conjunction with, and remote from, one or more signal varying devices 12. The remote controllers 50 can be configured to detect and monitor one or more characteristics of optical signals, and the detected characteristics can be used by the controller 50 to provide remote feedback control to the signal varying devices 12 via control lines 52. For example, the remote controllers 50 can monitor the optical signals at one point 53 in a link and control one or more of the signal varying devices 12 at other points in that link, or signal varying devices 12 in a different link. In another example, the remote controller 50 can control one or more signal varying devices 12 along a link to produce desired characteristics in optical signals reaching a processing node 14. The remote controllers 50 can be connected to the fiber 28, for example, via an optical tap and an optical to electrical converter, such as in the manner discussed above with respect to the local controller 32. In another embodiment, the remote controller 50 can be connected to the fiber 28 via another device, such as a receiver 18 in an optical processing node 14.

The remote controllers 50 can provide more coordinated control over the signal varying devices 12 than is possible with local controllers 32. As a result, one or more signal varying devices 12 can be coordinated to achieve a result over a large section of the system 10. The coordinated use of both local and remote controllers 32, 50 can provide a complementary control scheme for the system 10, although a system 10, or portions of a system 10, can also employ only local controllers 32 or only remote controllers 50.

The remote controllers 50 can be configured to control the signal characteristics over an optical link, which generally includes the optical transmission fiber 28 and at least one signal varying device 12, extending between the processing nodes 14. The controller 50 also can be used to control the signal characteristics over multiple links, either separately or collectively, or over only a portion of a link. The control lines 52 can include dedicated lines and/or as supervisory channels transmitted on the fiber 28 between the controller 50 and the signal varying devices 12. The supervisory channels can, for example, be transmitted as one or more separate optical channels on the fiber 28 connected to the device 12 being controlled, or on one or more separate fibers, with or without other signal channels traveling towards the device 12.

The remote controllers 50 can be used to control the signal varying devices 12 collectively, in groups, or individually as required in the system 10. For example, the remote controllers 50 can directly control the signal varying devices 12, such as by directly controlling the pump sources 30, or the controllers 50 can indirectly control the signal varying devices 12, such as by sending control signals to one or more of the local controllers 32. For example, the remote controllers 50 can send signals giving the local controllers 32 instructions, such as to increase or decrease the gain by a certain amount, change to another gain profile, modify another parameter of the signal varying device, etc. The remote controller 50 can give specific instructions on how to achieve the desired result, such as to increase pump power by 2 dB, or it can be left to the local controllers 32 to determine how to best achieve the desired control instructions. Alternatively, the remote controllers 50 can provide only feedback of remote signal characteristics, and the local controllers 32 can make the control decisions. Furthermore, as discussed above, the local controllers 32 can monitor and adjust their own signal varying device 12 and the signals passing through the signal varying device 12 to achieve other desired results. The complexity of the controllers 34, 50 overseeing the operation of the system 10 will depend, in part, upon the extent of individual control exerted over the individual signal varying devices 12. For example, the control scheme can be simplified by operating the signal varying devices 12 in concert to achieve desired characteristics in the signal arriving at a processing node 14.

The remote controllers 50 can provide remote control signals to some or all of the signal varying devices 12. For example, the remote controllers 50 can provide remote control signals to signal varying devices 12 in key locations, or the remote controllers 50 can provide control signals to every third signal varying device 12, or in some other distribution. One remote controller 50 can provide feedback to one or more signal varying device 12. If multiple remote controllers 50 are used, each remote controller 50 can control its own unique subset of signal varying devices 12, or there can be overlap in the signal varying devices 12, such as to provide redundancy in the event of a failure of a remote controller 50, or to provide cooperative control, such as through voting mechanism in which the signal varying devices 12 can disregard remote control signals which are inconsistent with a majority of other remote control signals or which are out of a preset range, or through averaging the remote control signals, or through other mechanisms. Signal varying devices 12 that do not receive control signals from the remote controllers 50 can include a local controller 32 to provide control as discussed above, or they can have neither a local controller 32 nor feedback from a remote controller 50.

Figure 11:
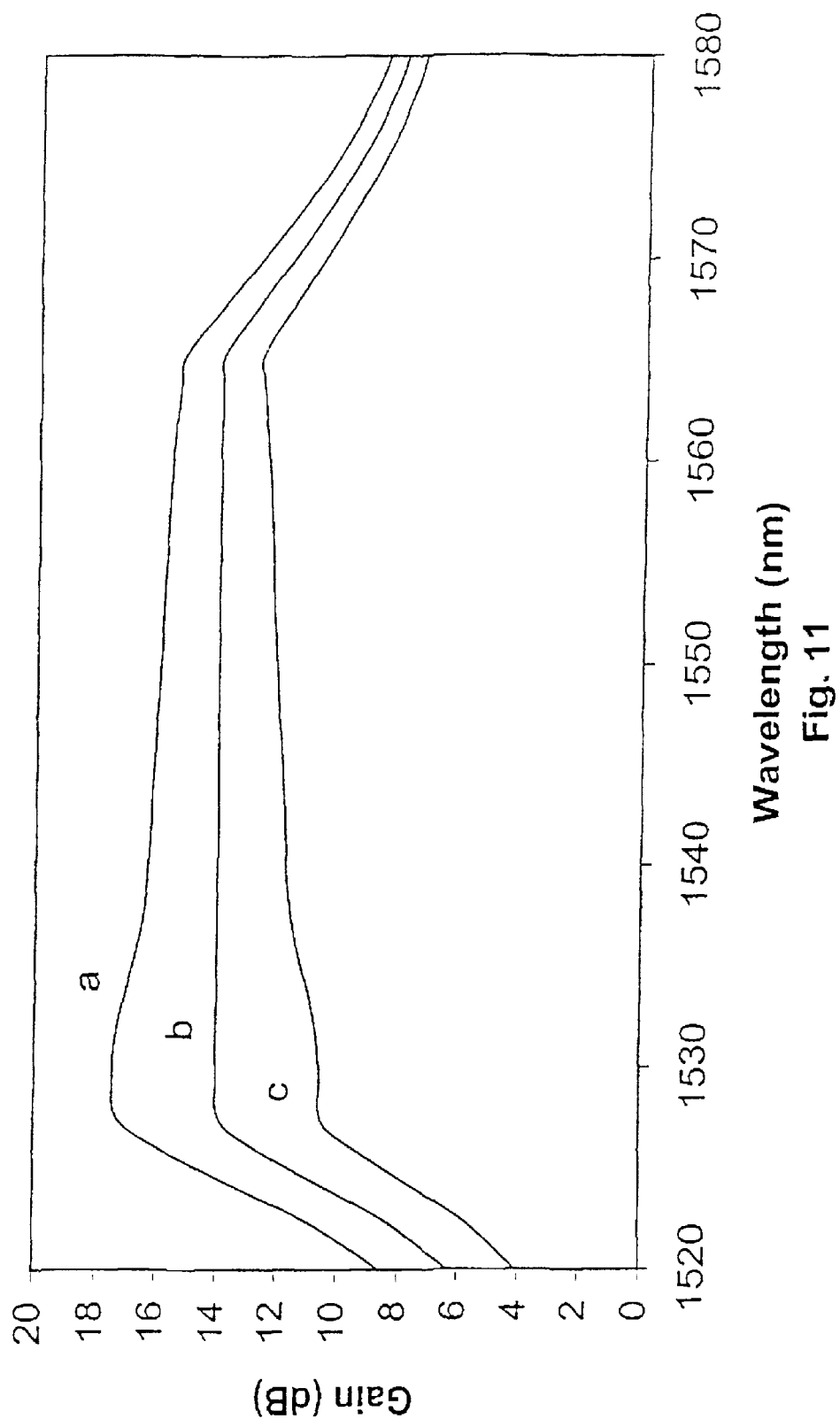
FIG. 11 shows exemplary EDFA gain curves.
Figure 12A:
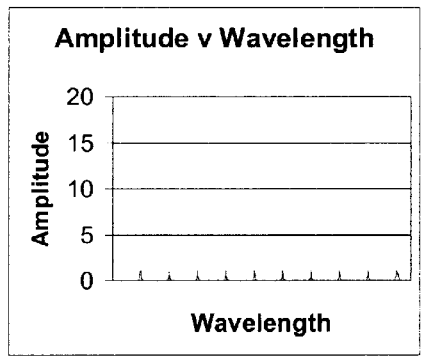
FIGS. 12a–12f show an exemplary relationship between amplitude and wavelength of optical signals as they travel through a system.
Figure 12B:
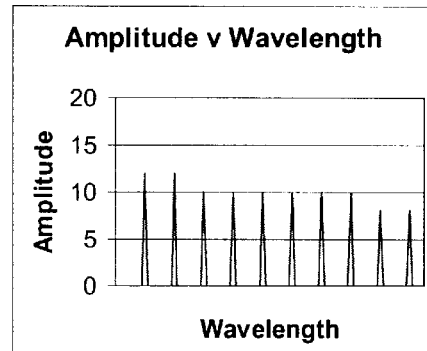
Figure 12C:
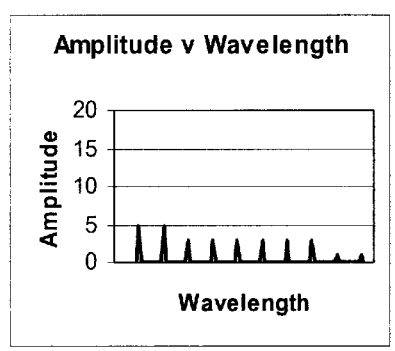

FIGS. 11 and 12a–12f illustrate the interaction of the remote controller 50 with the signal varying devices 12. FIG. 11 shows several exemplary EDFA gain curves, illustrating how EDFA performance can vary with signal wavelength and amplification power (gain) of the EDFA. FIG. 12a depicts an optical signal intensity profile versus wavelength for a signal prior to entering a signal varying device 12. A flat intensity profile is shown in FIG. 12a to facilitate explanation of the controller 50. If a signal varying device 12 is operated as an amplifier according to gain curve (a) shown in FIG. 11, then the signal of FIG. 12a will emerge from the signal varying device 12 having an intensity profile similar to that shown in FIG. 12b. As the optical signal proceeds though the fiber 28, it incurs fiber losses and may develop an intensity profile similar to FIG. 12c as it enters a subsequent signal varying device 12. If a subsequent signal varying device 12 is operated as an amplifier having a gain profile similar to curve (b) in FIG. 11, then the optical signal will emerge from the subsequent signal varying device 12 having an intensity profile similar to FIG. 12d.

Figure 12D:
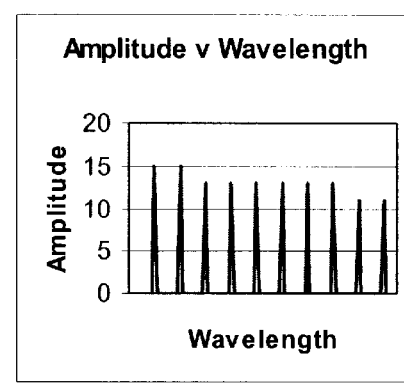
Figure 12E:
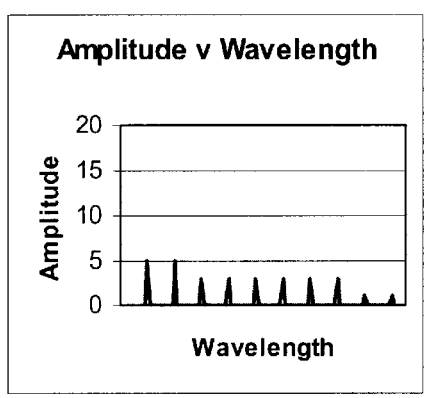
Figure 12F:
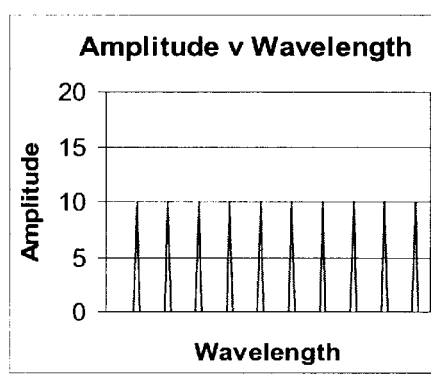

The optical signal of FIG. 12d can be further propagated through the fiber 28 and additional signal varying devices 12 incurring further fiber losses and gain profile variations. As the optical signal enters a signal varying device 12 preceding an optical processing node, it may have a profile similar to FIG. 12e. If the signal varying device 12 preceding the optical processing node is operated having a gain profile similar to curve (c) in FIG. 11, then the optical signal will emerge from the preceding signal varying device and reach the processing node having a substantially uniform gain profile similar to that shown in FIG. 12f.

The control of each signal varying device 12 can be based on the profile of the optical signal at the optical processing node 14 (FIG. 12f), or it can be based on a profile at another point, such as the profile at each signal varying devices 12 along the link. While the example shown in FIGS. 12a–f uses the signal intensity and profile as the detected characteristics, other characteristics, such as noise and signal to noise ratio, and statistical measures, such as maximum, minimum, averages, and distributions, can also be used to control the system 10.

In one embodiment, the remote controller 50 is used to detect and monitor the optical signal as it approaches the optical processing node 14. In another embodiment, the remote controller 50 is used to variably control the performance of the signal varying devices 12 in the link to achieve the desired characteristic at the processing node 14. The control function can be performed by tapping off a portion of the optical signal as it approaches or reaches a processing node and detecting the optical signal characteristics, such as with an optical spectrum analyzer.

The detected signal characteristics can be compared to either absolute or relative reference characteristics, such as the desired wavelength characteristic profiles. The comparison yields a system variance that is compared to a control variance. If the system variance is within the control variance, the controller 50 does not vary the settings of the signal varying devices 12 in the link. If the system variance is outside the control variance, the controller 50 will send control signals via control line 52 to vary the settings of the signal varying devices 12 until the system variance is within the control variance.

For example, in an embodiment in which the signal varying device 12 includes Raman and erbium amplifiers, the optical or pump energy, i.e., pump power, supplied to the amplifiers can be controlled to vary the output power of the amplifier to achieve the desired characteristics at the optical processing node. In addition, the Raman or erbium fiber sections can also serve as variable attenuators in which the loss of the sections is controlled by varying the pump power supplied to the Raman or erbium fiber sections.

The controller 50 can be used to control the optical signal characteristics by varying the performance of one or more of the signal varying devices 12 individually, in groups, or collectively. The control system complexity, stability, and range of applicability will invariably depend upon the manner in which the signal varying devices 12 are operated.

For example, consider an embodiment in which only one out of N signal varying devices 12 in a link is being controlled by the controller 50. The controller 50 will most likely have to vary the one signal varying device 12 over a wide range to compensate for uncontrolled variations in the N-1 independent signal varying devices 12. In contrast, if all the signal varying devices 12 in the link are individually controlled, the controller 50 can vary the performance of any combination of signal varying devices 12 to produce a change in the optical signal characteristics. However, the number of possible control combinations may require more complex control schemes and could lead to system instability and slower response times. In contrast, when all of the signal varying devices 12 in the link are controlled in concert by the controller 50, the link can be controlled with a less complex control scheme. This is because the possible control combinations have been decreased and variations in the system can be averaged over all of the signal varying devices 12 in the link. Also, the link stability is improved because the signal varying device 12 performance is varied continuously along the link. As such, the probability that any given signal varying device 12 will have to be adjusted grossly will be reduced, thereby improving the response time of the link.

Individual control over the signal varying devices 12 can be useful for facilitating initialization during manufacturing and installation, and resetting and fine tuning of the signal varying devices 12 during operation. The signal varying devices 12 can also be controlled in groups, to provide additional control over different types of signal varying devices 12 deployed in the system 10.

FIGS. 13–21 show various embodiments of signal varying devices 12 including one or more of an amplifier 54, an attenuator 56, and a filter 58, although the signal varying devices 12 can include other components and other combinations of components, such as various gain flattening configurations. In addition, although the remote control line 52 is depicted as being directly connected to just one of the components, it can be connected to more than one component to allow for control over more than one characteristic of the signal varying device 12, and it can be connected to the local controller 32, either alone or in combination with one or more of the components, or via one or more intermediate devices or processors. Likewise, the local controller 32 can be connected at points 53 in the signal varying device 12 other than those shown in the illustrated embodiments, and it can be connected via one or more local control lines 60 to components and to combinations of components other than those shown in the figures. While the present invention does not require that each signal varying device 12 operate with a uniform gain profile, improved gain profile flatness will tend to increase the stability, flexibility, and overall performance of the system 10.

The amplifiers 54 and attenuators 56 can be single or multiple stages, and can include EDFAs, Raman amplifiers, and/or other gain flattening amplifier configurations. The amplifiers 54 and attenuators 56 can include concentrated (or "lumped") and/or distributed amplifiers, other combinations that provide fixed or variable gain and/or attenuation, and can also include other components, such as gain flattening filters. The amplifiers 54 and attenuators 56 can be controlled, for example, by varying the pump power, which can be provided locally or remotely. Such control can be affected by the local and remote controllers 32, 50, and can allow a single device to operate as both an amplifier and an attenuator, as necessary to achieve the desired signal characteristics.

The filters can include, for example, one or more Mach-Zehnder, Fabry-Perot or dichroic filters, fixed or tunable Bragg gratings, or other filters as may be required in system 10. The filters may be used in combination with other components, such as directional couplers and/or circulators to vary the signal, such as described in U.S. Pat. Nos. 5,007,705, 5,283,686 and 5,579,143.

Figure 13:
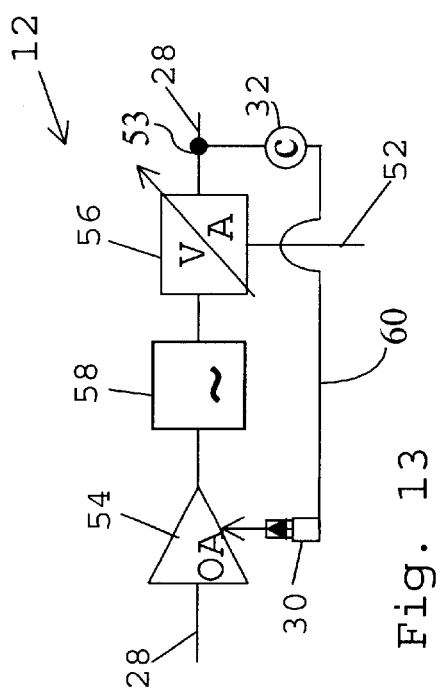

In FIG. 13, the signal varying device 12 is controlled jointly by the local and remote controllers 32, 50, with the remote controller 50 controlling the variable attenuator 56 and the local controller 32 controlling the amplifier pumps 30. The remote controller 50 uses the attenuator 56 to vary the optical signal intensity after the optical signal has passed through the amplifier 54 and filter 58. The optical signal emerging from the variable attenuator 56 has a signal intensity profile versus wavelength that was produced by the preceding amplifier 54 and filter 58, and reduced via the attenuator 56 to a level controlled by the remote controller 50. The local controller 32 receives feedback from a point 53 after the optical signal has passed through the amplifier 54, filter 58, and attenuator 56. The local controller 32 can, for example, vary the power supplied by the amplifier pumps 30 to control the output power of the signal varying device 12. The local controller 32 also can adjust the pumps 30 so that the power levels of the optical signals leaving 53 the signal varying device 12 are maintain at a predetermined power level. That predetermined power level can be, for example, the power necessary to overcome the loss in the fiber 28 and to provide a signal having a predetermined power at the next signal varying device 12 or processing node 14.

Figure 14:
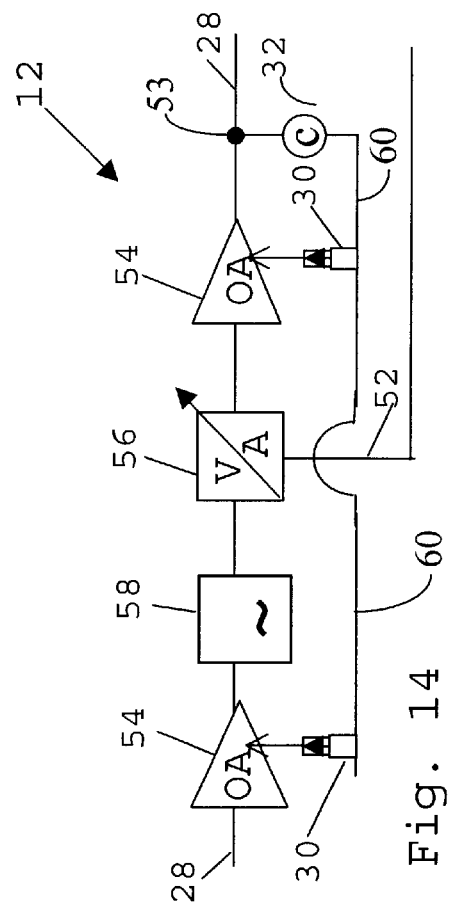

In FIG. 14, an additional amplifier 54 is provided after the attenuator 56 and is controlled by the local controller 32 to provide additional flexibility in controlling the optical signal characteristics.

Figure 15:
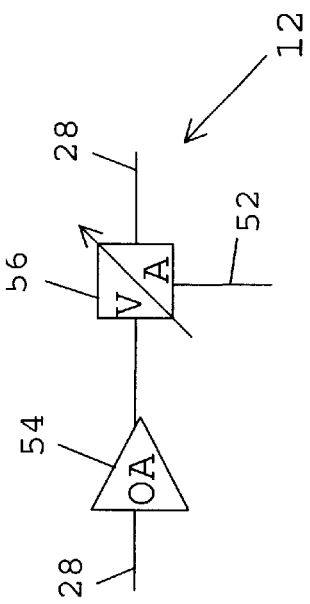

In FIG. 15, the signal varying device 12 includes the attenuator 56 preceding the amplifier 54 with the filter 58 at the end. In this configuration the amplifier 54 can be preset to deliver a prescribed level of amplification to the signal. The attenuator 56 can be operated to control the input power to the amplifier 54 so that the signal will exit the amplifier 54 and pass through the filter into the fiber at a predetermined intensity.

Figure 16:
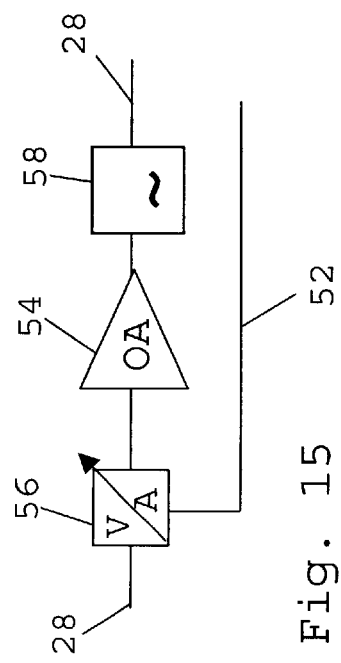

In FIG. 16, the amplifier 54 can be operated at a predetermined amplification power. The attenuator 56 is then operated to deliver the optical signal into the fiber 28 at a predetermined intensity.

FIGS. 17–19 show the signal varying device 12 can be embodied solely as attenuators, amplifiers, and filters, respectively. In the illustrated embodiments, each of the devices is controlled by the remote controller 50, although the local controller 32 can be used in place of or in conjunction with the remote controller 50.

In FIG. 20, an amplifier 54 is operated in combination with the filter 58 to vary the characteristics of the optical signal being delivered into the fiber 28.

In FIG. 21, the signal varying device 12 is associated with a processing node 14. This configuration can provide for monitoring and control of the signal characteristics immediately before and after the signal has been processed in the processing node 14. In an alternative embodiment, the signal varying device 12 can be within the processing node 14.

Unlike prior art systems, the present invention can provide for increased stability as the length of the system 10 is increased. The increased stability is possible because the system performance can be averaged over a larger number of signal varying devices between optical processing nodes. Thus, the addition of signal varying devices 12 to the system 10, while adding loss to the system 10, can actually provide additional system stability.

Those of ordinary skill in the art will appreciate that numerous modifications and variations that can be made to specific aspects of the present invention without departing from the scope of the present invention. It is intended that the foregoing specification and the following claims cover such modifications and variations.

What is claimed is:

1. An optical communications system, comprising:
   a plurality of optical processing nodes;
   optical fiber optically connecting the optical processing nodes;
   a signal varying device including a lumped optical amplifier optically connected to the optical fiber, wherein the signal varying device includes a local controller connected to the optical fiber and the amplifier, and wherein the local controller provides local control signals to the optical amplifier in response to a characteristic of an optical signal in the optical fiber at the signal varying device; and
   a remote controller connected to the optical fiber at a remote location remote from the signal varying device and providing remote control signals to the signal varying device in response to a characteristic of an optical signal in the optical fiber at the remote location.

2. The system of claim 1, wherein:
   the remote controller provides the local controller with remote control signals indicative of at least one operating parameter for the signal varying device; and
   the local controller provides the local control signals to the amplifier in response to the remote control signals.

3. The system of claim 2, wherein the local controller provides local control signals to the amplifier in response to both the remote control signals from the remote controller and the characteristic of an optical signal in the optical fiber at the signal varying device.

4. The system of claim 1, wherein:
   the remote controller provides the remote control signals to the amplifier in response to a characteristic of an optical signal in the optical fiber at the location remote from the signal varying device; and
   the local controller provides the local control signals to the amplifier in response to the characteristic of an optical signal in the optical fiber at the signal varying device.

5. The system of claim 1, wherein:
   the amplifier is responsive to control signals from at least one of the local controller and the remote controller;
   the signal varying device further includes an additional device optically connected to the optical fiber in series with the lumped amplifier and selected from a group consisting of an optical filter, an optical attenuator, and an optical amplifier; and
   the additional device receives control signals from at least one of the local controller and the remote controller.

6. The system of claim 5, wherein the signal varying device includes:
   a Raman amplifier connected to the fiber and responsive to remote control signals from the remote controller; and an Erbium doped fiber amplifier connected to the fiber and responsive to local control signals from the local controller.

7. The system of claim 1, including a plurality of signal varying devices which are responsive to the remote control signals from the remote controller.

8. The system of claim 7, further comprising at least one signal varying device that is not responsive to any of the remote control signals.

9. The system of claim 8, wherein the at least one signal varying device that is not responsive to the remote control signals includes a local controller.

10. The system of claim 1, including:

a plurality of remote controllers;

a plurality of groups of signal varying devices, wherein each group includes at least one signal varying device, and wherein each of the signal varying devices is responsive to remote control signals from the remote controllers.

11. The system of claim 10, wherein a first group of signal varying devices is responsive to remote control signals from only a first remote controller, and a second group of remote controllers is responsive to remote control signals from only a second remote controller.

12. The system of claim 10, including at least one signal varying device which is not responsive to any of the remote control signals.

13. The system of claim 1, wherein the remote controller is located in one of the optical processing nodes.

14. The system of claim 13, wherein the remote controller is connected to the optical fiber via a receiver in the optical processing node.

15. An optical communications system, comprising:

a plurality of optical processing nodes;

optical fiber optically connecting the optical processing nodes;

a signal varying device for varying optical signals passing through optical fiber at the signal varying device, including:

a lumped optical amplifier optically connected to the optical fiber;

a local optical tap on the optical fiber at the signal varying device;

a local optical to electrical converter having an optical input connected to the local optical tap and having an electrical output;

a local controller connected to the electrical output of the optical to electrical converter and providing a local control signals to the amplifier for varying optical signals at the signal varying device in response to at least one characteristic of the optical signals at the signal varying device;

a remote optical tap on the optical fiber at a remote location remote from the signal varying device;

a remote optical to electrical converter having an optical input connected to the remote optical tap and having an electrical output; and a remote controller connected to the electrical output of the remote optical to electrical converter and providing a remote control signals to the signal varying device for varying optical signals at the signal varying device in response to at least one characteristic of optical signals at the remote location.

16. The system of claim 15, wherein:

the signal varying device includes an additional device selected from a group consisting of an optical filter, an optical amplifier, and an optical attenuator optically connected to the optical fiber; and the remote controller provides remote control signals to the additional device.

17. The system of claim 16, wherein the additional device includes:

Erbium doped fiber in series with the optical fiber connecting the optical processing nodes; and at least one Erbium pump source optically connected to the optical fiber and directing pump energy from the pump source towards the Erbium doped fiber.

18. The system of claim 17, wherein:

the lumped optical amplifier is a Raman amplifier; and the remote controller provides remote control signals to the Raman pump source.

19. The system of claim 15, wherein the remote tap and the remote optical to electrical converter are part of a receiver located at the remote location.

20. The system of claim 19, wherein the receiver and the remote controller are located in an optical processing node.

* * * * *